Sept. 20, 1966  C. G. GERHOLD  3,273,325
ROTARY GAS SEPARATOR
Filed Jan. 9, 1963  2 Sheets-Sheet 1

INVENTOR:
Clarence G. Gerhold
BY: James R. Hoatson Jr.
Philip T. Liggett
ATTORNEYS Sept. 20, 1966     C. G. GERHOLD     3,273,325
ROTARY GAS SEPARATOR Filed Jan. 9, 1963     2 Sheets-Sheet 2

INVENTOR:
Clarence G. Gerhold

BY:
*James R. Hoatson Jr.*
*Philip T. Liggett*
ATTORNEYS

United States Patent Office 3,273,325
Patented Sept. 20, 1966

3,273,325
ROTARY GAS SEPARATOR
Clarence G. Gerhold, Palatine, Ill., assignor to Universal Oil Products Company, Des Plaines, Ill., a corporation of Delaware
Filed Jan. 9, 1963, Ser. No. 250,739
3 Claims. (Cl. 55—405)

This invention relates to a rotary separator for separating gaseous mixtures of two or more components which differ in density. The instant apparatus is especially advantageous in the separation of hydrogen from mixtures with other gases, a problem quite common in present day refining technology. Such systems show high density differences but are difficult to separate by conventional means. The present invention, however, is not limited in its utility to this system and may be employed in the separation of a wide variety of other gaseous and vaporous mixtures.

In brief, the invention comprises a rotatable tapered vaned rotor member disposed within a surrounding, similarly tapered fluid-tight chamber or casing. Gaseous feed under superatmospheric pressure is injected into the casing through one or more tangential convergent nozzles located at intermediate points along the central longitudinal axis of the casing. The feed gas impinges as a high velocity jet, or plural spaced jets, upon the rotor vanes to cause rotation of the rotor. The rotor and its vanes are so shaped and proportioned that the body of gas within the casing is constrained to rotate at a constant angular velocity across the diameter thereof, thus providing a gradient in linear velocity, the latter increasing as one proceeds radially outwardly from the rotor surface to the wall of the casing. The separation attainable by this apparatus is the result of the following factors:

(1) Centrifugal force tends to move the several components of a rotating body of mixed gases away from the axis of rotation but the tendency is greater for the heavier components.
(2) When a gas is passed through a convergent nozzle, a portion of its static pressure is converted to velocity head, the extent of this conversion depending upon the molecular weight of the gas and on its velocity; for a given velocity, the residual static pressure for a lighter component is higher than for a heavier component.

In the case of the mixed gas stream charged to the present apparatus, there is pressure-equalized contact between the inlet jet or jets and the rotating mass of gas, and there occurs a migration of the lighter constituents of the more rapidly moving jet stream into the slower regions of the rotating mass of gas, and a migration of the heavier constituents to the faster regions of the rotating mass. By reason of the tapered annular separation zone, the light and heavy fractions of the gas flow in countercurrent contact prior to their removal from the separation zone, thus permitting the attainment of any desired product purity. Draw-off conduits for the light and heavy components of the mixture are provided at the points in the casing of minimum and maximum diameter, respectively, and are separated from one another by an appreciable distance along the axis of rotation. The cut point between light and heavy fractions is easily controlled by adjustment of the amounts withdrawn from the two ends of the separator.

In a broad embodiment, the present gas separation apparatus comprises a fluid-tight chamber the interior of which is of generally circular transverse cross-section and longitudinally tapered, a tapered rotor member within said chamber arranged to rotate about the central longitudinal axis of the chamber, a plurality of circumferentially spaced radial vanes carried by said rotor member and extending substantially the full length of the rotor member, at least one convergent feed nozzle tangentially connected to and communicating with the interior of said chamber at an intermediate point in the length thereof, a light gas withdrawal duct connecting with the end of the chamber of minimum diameter, and a heavy gas withdrawal duct connecting with the end of the chamber of maximum diameter.

Operation of the separation section results in a transfer of energy from the light gas stream to the heavy gas stream. In many cases, such an energy distribution between the product streams would be undesirable and it may be compensated for by providing a centrifugal compressor section at the light gas withdrawal end of the separation section and/or a turbine section at the heavy gas withdrawal end thereof, the compressor impeller and turbine blades being mechanically coupled to, or otherwise forming an integral part of, the main rotor member. In this way energy is transferred to the light gas product stream and extracted from the heavy gas product stream.

It is, therefore, a more limited embodiment of this invention to provide gas separation apparatus comprising a fluid-tight frustoconical casing having an axial passageway in the end of the casing of minimum diameter, an enclosed volute housing of enlarged diameter axially spaced beyond said minimum diameter end of the casing and communicating with the interior of the latter through said axial passageway, a frustoconical rotor member rotatably mounted within said casing and defining therewith an annular space of uniform radial width but of varying average diameter with respect to distance along the central longitudinal axis of the casing, a plurality of circumferentially spaced radial vanes carried by said rotor member, each vane extending substantially the full length of the rotor member and nearly across said annular space, an impeller member rotatably mounted within said volute housing, rotary shaft means connecting said rotor member with said impeller member, a number of convergent feed nozzles tangentially connected to and communicating with the interior of said casing at intermediate points in the length thereof, a light gas withdrawal duct tangentially connecting with said volute housing, and a heavy gas withdrawal duct connecting with the end of the casing of maximum diameter.

The turbine section may be incorporated into the above-described apparatus by providing a number of circumferentially spaced blades which extend axially from the major base of the frustoconical rotor member toward the maximum diameter end of the outer casing, and locating the heavy gas withdrawal duct so that it communicates with the interior of the casing through an axial passageway formed in said maximum diameter end of the casing.

It is contemplated that in the majority of applications the rotary separator will operate solely on the energy of the incoming gas stream. However it may be desirable in some cases to augment this energy by supplying additional power to the rotor from a suitable energy source. Such energy source may comprise, for example, an externally mounted electric motor, internal combustion engine, gas turbine or steam turbine, mechanically coupled to an extension of the rotor shaft. Alternatively, the rotor may be provided with suitable windings, and the stator equipped with a stator winding, so that the apparatus may be driven as an induction motor.

The structure and arrangement of the present invention may be more particularly described upon reference to the accompanying drawings which are presented as illustrative of a preferred embodiment of the invention but are not intended to be limiting upon the broad scope thereof.

FIGURE 1 of the drawings is a sectional elevation view of the rotary gas separator.

Figure 1:
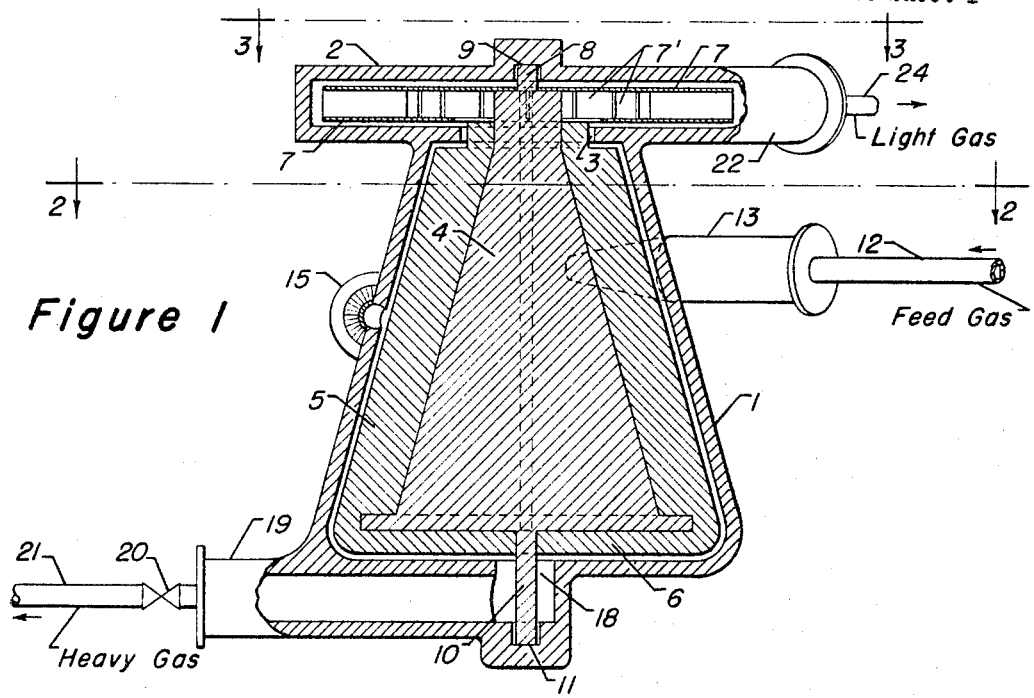
Figure 2:
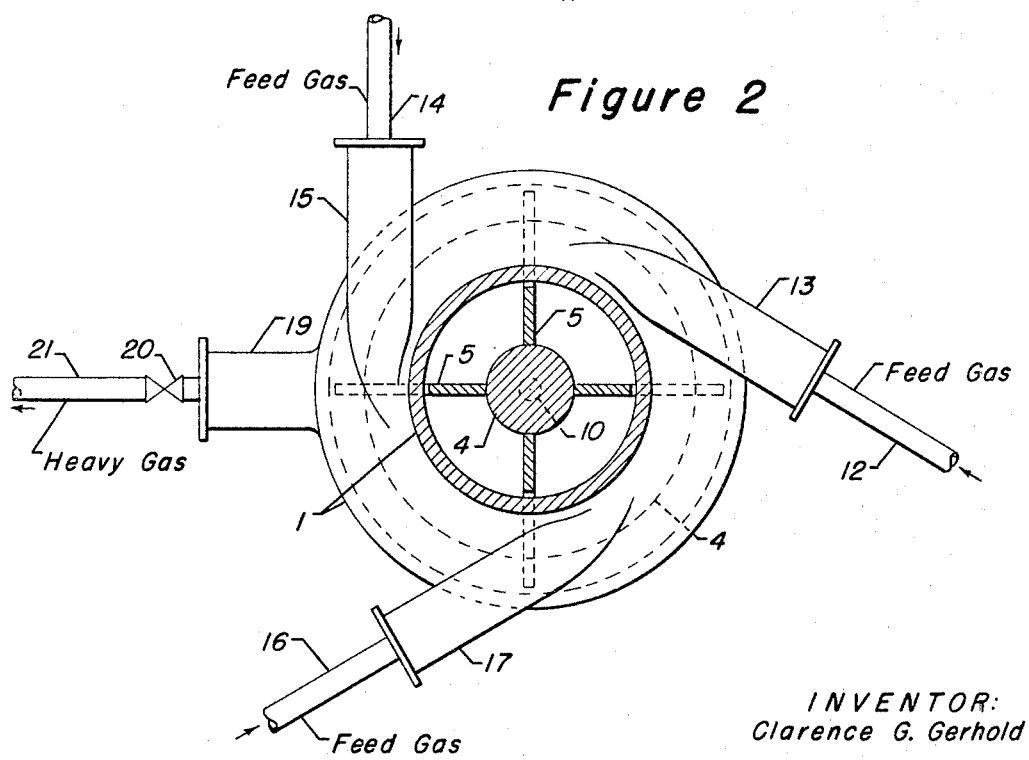
FIGURE 2 is a sectional plan view of the apparatus taken along line 2—2 of FIGURE 1.

Referring now to FIGURES 1 and 2, there is indicated a fluid-tight frustoconical chamber or casing 1 which comprises the separation section of the apparatus. Positioned above the minimum diameter end of casing 1 is an enclosed volute housing 2 which comprises the compression section of the apparatus. Housing 2 communicates with the interior of casing 1 through an axial passageway 3. Rotatably mounted and centered within casing 1 is a frustoconical rotor member 4 which, together with the tapered longitudinal wall of casing 1, defines an annular space of uniform radial width but of varying average diameter with respect to elevation or distance along the central longitudinal axis of the casing. Rotor 4 is provided with a plurality of circumferentially spaced radial vanes 5, each vane 5 extending longitudinally the full length of rotor 4 and transversely nearly across said annular space into close proximity to the longitudinal wall of casing 1, the outer edges of vanes 5 being substantially parallel with the casing wall. Vanes 5 are extended around the lower edge and across the undersurface of rotor 4 (said undersurface being the major base or maximum diameter end of the frustoconical rotor) to form a number of circumferentially spaced turbine blades 6 which project axially downwardly into close proximity to the maximum diameter end of casing 1. Blades 6 together with casing 1 comprise the turbine section of the apparatus.

Figure 3:
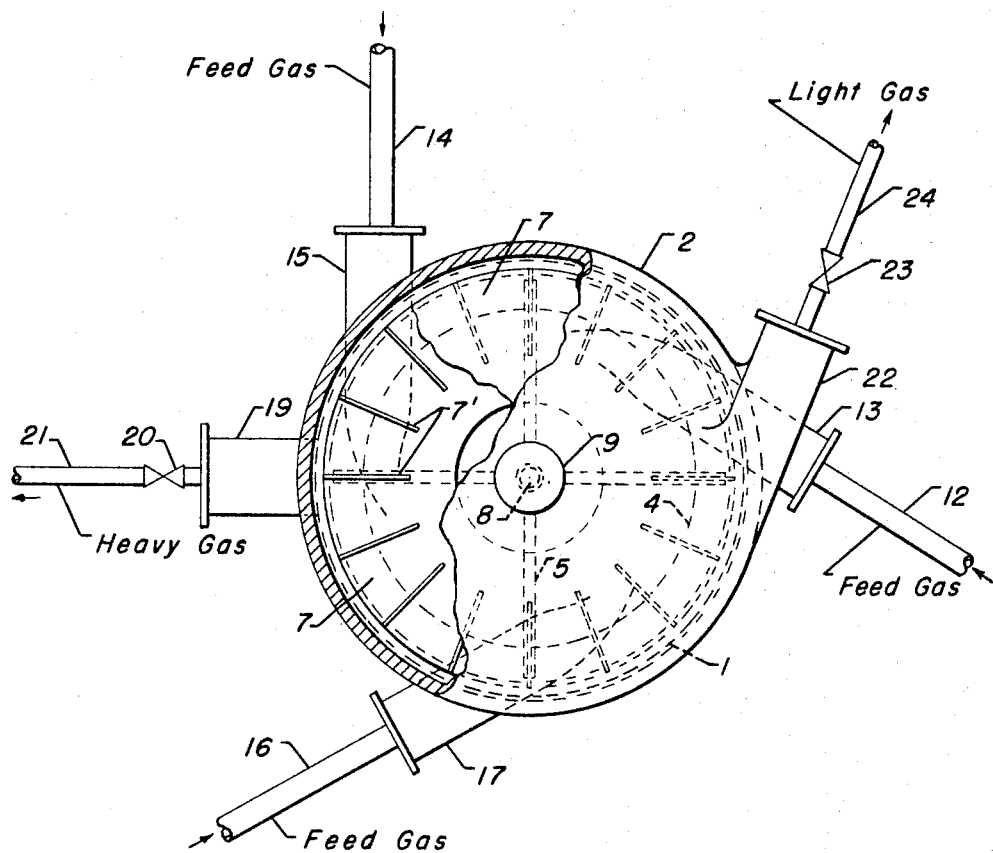
FIGURE 3 is a partially sectioned top plan view of the apparatus of FIGURE 1, taken along line 3—3 thereof.

In FIGURES 1 and 3, there is shown a compressor impeller 7 rotatably mounted and centered within volute housing 2, which impeller may be of the enclosed type with radial vanes 7', as illustrated, the open type with radial vanes only, a solid vaned disc, or other suitable construction known to those skilled in the compressor art. Impeller 7 is rigidly secured to an extension neck of rotor 4 projecting upwardly through passageway 3, which may be considered part of the rotary shaft means for the rotor, whereby impeller 7 is driven by and at the same speed as rotor member 4. The rotor-impeller combination is rotatably supported within casing 1 and volute housing 2 by means of upper and lower rotary shafts 8 and 10 which in turn engage, and are supported by, thrust bearings 9 and 11, respectively.

Feed gas is charged to the separation section through a number of convergent nozzles which are circumferentially spaced and, preferably, also axially or longitudinally spaced to provide more uniform loading throughout the separation section. Three such nozzles, e.g., nozzles 13, 15 and 17, are illustrated in FIGURES 1 and 2, although a greater or lesser number (in some cases one will suffice) may be employed where desired. Nozzles 13, 15 and 17, which connect tangentially with casing 1, are designed to reduce the static pressure of the feed substantially with efficient conversion into velocity head. The light gas fraction is taken off through a discharge duct or conduit 22 tangentially connecting with volute housing 2. The heavy gas fraction is removed through an axial passageway 18, formed in the maximum diameter end of casing 1 through which shaft 10 also extends, and thence through discharge conduit 19.

The operation of the rotary separator is essentially quite simple. Feed gas under superatmospheric pressure is charged through lines 12, 14 and 16 and nozzles 13, 15 and 17, respectively, into casing 1. The gas jets impinge on vanes 5 and cause rotor 4 to spin at a constant predetermined velocity depending upon inlet pressure, nozzle design, frictional effects, etc. The vaned rotor in turn forces the body of gas within casing 1 to rotate at a constant angular velocity, although the tangential velocity thereof will vary proportionally from point to point with radius. Pressure-equalized contact obtains between the inlet jets and the rotating mass of gas, and the lighter components of the more rapidly moving jet streams migrate into the slower regions of the rotating mass of gas, and the heavier constituents thereof migrate into the faster regions of the rotating mass. The lighter components of the feed progress toward the minimum diameter end of casing 1 and thence through axial passageway 3 into the compression section, while the heavier components of the feed progress toward the maximum diameter end of the casing. The increased kinetic energy of the heavy gas stream is recovered, at least in part, by expansion thereof through the turbine section provided by turbine blades 6, and the thus expanded heavy gas fraction is then discharged through lower axial passageway 18 and conduit 19. The shaft work thus recovered from the heavy gas stream is transferred to the light gas stream through the operation of the compression section, wherein the light gas fraction is compressed to a pressure intermediate the feed pressure and the pressure existing at passageway 3, and the compressed light gas fraction is then discharged from the apparatus through conduit 22. The cut point between light and heavy fractions may be controlled by adjustment of the amounts withdrawn from the two ends of the separator, which may be accomplished by means of throttle valve 23 in line 24 and throttle valve 20 in line 21. Valves 20 and 23 may be adjusted manually, or may be automatic throttle valves responsive to the flow rates of the light and heavy gas streams, or to the flow ratio of said streams, or to a signal from a suitable product stream analyzer.

The instant rotary separator may be utilized to effect the separation of numerous gaseous or vaporous mixtures of various compositions. A typical mixture, such as the offgas from a naphtha reforming unit or heavy oil hydrotreating unit, may comprise hydrogen, $C_1$–$C_4$ hydrocarbons and hydrogen sulfide under a pressure ranging from 150–3000 p.s.i.g. or more; another typical mixture is the normally gaseous overhead from a fluid catalytic cracking unit following prefractionation of the hot reactor effluent, which comprises hydrogen, methane, ethane, propane, propylene, butane, butylene, nitrogen, water vapor and hydrogen sulfide at a pressure within the range of 10–400 p.s.i.g. or more; still another mixture which may be resolved by the instant apparatus is the effluent from a hydrogen generation process unit employing the steam reforming of light hydrocarbons and which comprises predominantly hydrogen, carbon monoxide and carbon dioxide at a pressure of 10–100 p.s.i.g. The light gas product obtained from the above feeds will be hydrogen-rich at any commercial purity desired.

Various modifications to and alternate arrangements of the disclosed apparatus will be apparent to those skilled in the art. For example, the rotor and casing need not be linearly tapered, but may have a curved taper as provided by a parabolic or hyperbolic surface of revolution, for example. Two, three or more single stage separators may be cascaded together, or stacked on a common rotary shaft, with the light gas discharge from one stage comprising the feed gas to the next stage, or the heavy gas discharge from one stage comprising the feed gas to the next stage, depending upon the separation required. It is not necessary, of course, that the axis of rotation of the rotary separator be vertical, and it may be operated horizontally or in an inclined position as a particular application may warrant.

I claim as my invention:

1. A rotary gas separator comprising:
  (a) a chamber defined by a frustoconical casing having a first circular endwall of minimum diameter and a second circular endwall of maximum diameter, and a central aperture through each of said endwalls;
  (b) a frustoconical rotor member rotatably mounted within said chamber and having its major base adjacent said second endwall and defining with the chamber an annular space of uniform radial width but of varying average diameter with respect to distance along the axis of rotation of the rotor member;
(c) a plurality of circumferentially spaced radial vanes attached to and extending radially outwardly from the rotor member, each radial vane extending substantially the full longitudinal length of the rotor member;
(d) a number of circumferentially spaced blades attached to and extending across the major base of said rotor member and projecting longitudinally into close proximity to said second endwall;
(e) an enclosed volute housing of larger diameter than and spaced beyond said first endwall and communicating with said chamber through the central aperture in said first endwall;
(f) an impeller member rotatably mounted within said volute housing;
(g) rotary shaft means connecting said rotor member with said impeller member;
(h) a number of convergent feed nozzles tangentially connected to said casing and communicating with said chamber at points which are spaced apart from one another both radially and also along the longitudinal length of the casing;
(i) a light gas withdrawal duct tangentially connecting with said volute housing; and
(j) a heavy gas withdrawal duct connecting with the central aperture in said second endwall.

2. The apparatus of claim 1 further characterized in that said light gas withdrawal duct and said heavy gas withdrawal duct each comprise a throttle valve for adjusting the rate of gas flow through the respective duct.

3. The apparatus of claim 1 further characterized in that said vanes extend nearly across said annular space, the outer longitudinal edges of the vanes being substantially parallel with the longitudinal wall of the chamber.

References Cited by the Examiner

UNITED STATES PATENTS

| | | | |
|---|---|---|---|
| 940,141 | 11/1909 | Fogarty | 55—404 |
| 1,004,760 | 10/1911 | Fetzer | 55—17 X |
| 1,101,548 | 6/1914 | Hoffman | 55—17 X |
| 1,123,867 | 1/1915 | Gue | 55—17 X |
| 2,258,901 | 10/1941 | Lykken | 55—400 |
| 2,278,397 | 3/1942 | Scheibe et al. | 55—199 X |
| 2,291,656 | 8/1942 | Scheibe | 55—408 X |
| 2,942,687 | 6/1960 | Kollander | 55—405 |

FOREIGN PATENTS

| | | |
|---|---|---|
| 206,417 | 11/1959 | Austria. |
| 645,564 | 6/1928 | France. |
| 1,150,088 | 7/1957 | France. |
| 176,807 | 10/1906 | Germany. |
| 329,240 | 11/1920 | Germany. |
| 4,250 | 10/1881 | Great Britain. |
| 237,617 | 10/1926 | Great Britain. |
| 285,928 | 2/1928 | Great Britain. |
| 16,713 | 8/1907 | Norway. |

OTHER REFERENCES

German printed application 1,109,650, Aachen et al., June 1961.

HARRY B. THORNTON, *Primary Examiner.*

REUBEN FRIEDMAN, *Examiner.*

D. TALBERT, *Assistant Examiner.*